United States Patent [19]

Barker

[11] 4,357,362

[45] Nov. 2, 1982

[54] METHOD OF REDUCING FISHY ODOR OF PACKAGED FISH PRODUCT

[75] Inventor: David Barker, Barrow-on-Soar, England

[73] Assignee: Mars Limited, London, England

[21] Appl. No.: 189,628

[22] Filed: Sep. 22, 1980

Related U.S. Application Data

[63] Continuation of Ser. No. 949,987, Oct. 10, 1978, abandoned.

[30] Foreign Application Priority Data

Oct. 10, 1977 [GB] United Kingdom ............... 42132/77

[51] Int. Cl.$^3$ ............................................. A23L 1/325
[52] U.S. Cl. ..................................... 426/643; 426/407; 426/129; 426/805; 426/533
[58] Field of Search ............... 426/643, 486, 332, 325, 426/805, 652, 488, 533, 657, 407, 129

[56] References Cited

U.S. PATENT DOCUMENTS

| | | | |
|---|---|---|---|
| 1,485,333 | 2/1924 | Hurt | 426/332 |
| 2,289,780 | 7/1942 | Hickman | 426/332 |
| 2,461,651 | 2/1949 | Mathiesen | 426/325 |
| 2,656,275 | 10/1953 | Stevenson | 426/643 |
| 2,813,027 | 11/1957 | Galliver et al. | 426/643 |
| 2,934,436 | 4/1960 | May | 426/533 |
| 3,202,514 | 8/1965 | Burgess | 426/532 |
| 3,468,674 | 9/1969 | Levin | 426/643 |
| 3,620,772 | 11/1971 | Kitada et al. | 426/533 |
| 3,663,234 | 5/1972 | Ichihata | 426/643 |
| 3,851,078 | 11/1974 | Khay et al. | 426/643 |
| 3,930,045 | 12/1975 | Mosher et al. | 426/533 |
| 3,985,904 | 10/1976 | Bernotavicz | 426/643 |
| 4,001,445 | 1/1977 | Horrocks et al. | 426/643 |
| 4,089,978 | 5/1978 | Lugay et al. | 426/533 |

FOREIGN PATENT DOCUMENTS

| | | | |
|---|---|---|---|
| 560490 | 7/1958 | Canada | 426/805 |
| 45-3185 | 2/1970 | Japan | 426/643 |
| 49-24667 | 6/1974 | Japan | 426/533 |

OTHER PUBLICATIONS

Symposium on Foods: The Chemistry & Physiology of Flavors, Avi Publ. 1967, Schultz et al.
Flavor Chemistry, Gould Editor, A.C.S. Publ. 1966.
Advances in Food Research, vol. 14, pp. 235-245, 1966.

Primary Examiner—Steven L. Weinstein
Attorney, Agent, or Firm—Davis, Hoxie, Faithfull & Hapgood

[57] ABSTRACT

A process for reducing a fishy smell in a packaged food product containing a fishy ingredient wherein a nontoxic reducing agent in a fishy odor reducing amount is mixed with other ingredients including fish material, to produce a food product, the product is sealed in a container and subjected to heat sterilization within the sealed container.

3 Claims, No Drawings

METHOD OF REDUCING FISHY ODOR OF PACKAGED FISH PRODUCT

This is a continuation of Application Ser. No. 949,987, filed Oct. 10, 1978, now abandoned.

DESCRIPTION OF INVENTION

The present invention relates to the preparation of improved proteinaceous food products, for either human or animal consumption. More particularly it relates to the preparation of canned food products of improved aroma.

Canned dog and cat foods in the past frequently included fish as part of the formulation. Products containing fish, however, have a fishy smell and this has limited the appeal of these foods for, although their palatability to animals has been high, the smell of the food itself has been unpopular with housewives. Not only does the fish smell quickly spread, but the animals' breath is also tainted.

Fish is good quality protein, furthermore it is cheaper than most meats. If more fish could be included in canned foods without the disadvantage of the fishy smell, then the canned food could be made cheaper without loss of nutritional value. The quality of the raw fish material is crucial to the smell of the final product. A batch of fish may be perfectly satisfactory from the point of view of toxicology, palatability, and microbiology but if it has too strong a smell it may be unacceptable as an ingredient in canned food. This single factor can thus limit the usefulness of fish.

Some products are required to have a slight fishy smell, more especially in food for cats, even here the smell can become too strong. In these cases it would be an advantage to have some control over the fishy smell, without removing it completely.

It is an object of the present invention to reduce or remove the fishy smell in canned proteinaceous food products containing fish material as an ingredient. By "fish material" is here meant the flesh, offal or other edible components of cold-blooded aquatic animals.

In accordance with this invention a composition of edible substances including fish material is subjected in a sealed container, to sterilising heat in the presence of a non-toxic reducing agent preferably an organic reducing agent.

The preferred organic reducing agents are reducing sugars, which have a number of advantages, as described below.

Examples of suitable sugars include ribose, glucose, xylose, lectose, galactose, fructose, meltose, arabinose, mannose and rhamnose. The reducing sugar need not be added as such, but can be added in the form of a derivative or precursor from which the sugar is liberated or produced under the conditions prevailing in the product, for example, during retorting.

Other suitable organic reducing agents are physiologically and organoleptically acceptable aldehydes or ketones, cystine, cysteine, butylated hydroxyanisole and phosphatidyl choline (lecithin).

The reducing agent should be mixed with the fish material and, optionally other ingredients before the mixture is heat charged into cans, sealed and retorted.

Although the mechanism by which the fishy smell is controlled or eliminated is not fully understood, it is known that the smell of fish in a canned product is mainly due to the volatile amines such as methylamine, dimethylamine or trimethylamine, and since these cannot evaporate from a sealed can it may be that the reducing agents react with the amines and thereby reduce the fishy smell.

If enough reducing agent is added it will totally eliminate the fishy smell. The reaction is unlikely to be stoichiometric and an excess of the reducing agent is needed to completely eliminate the smell.

The preferred addition of reducing agent for the purpose of the present invention is in the range 0.1 to 5% by weight of the product.

The odour reducing reaction takes place in the presence of meats, cereals and many other normal food materials.

The use of reducing sugars to reduce or eliminate a fishy smell in accordance with the invention has a number of particular advantages, beyond the general advantage of the invention in making a wider variety of fish materials available as acceptable ingredients of canned food compositions.

Reducing sugars are ordinary dietary items and are metabolisable. The cost of such sugar should not therefore be regarded as an additional cost in the preparation of the canned product but can be absorbed into the cost of nutritional raw materials.

Moreover, there is no toxicological problem with the use of most reducing sugars and they do not come under the restrictions of prohibitions or any regulation relating to the use of "additives".

The following examples illustrate the practice of the invention. All quantities are by weight unless the context otherwise requires.

EXAMPLE 1

This series of formulations represent canned dog foods containing fish of different kinds.

|  | A | B | C | D | E | F |
|---|---|---|---|---|---|---|
| Beef trimming, minced | 6 | 6 | 6 | 6 | 6 | 6 |
| Maize grits | 17 | 19 | 17 | 17 | 17 | 19 |
| Blood | 9 | 9 | 9 | 9 | 9 | 9 |
| Salt | 0.7 | 0.7 | 0.7 | 0.7 | 0.7 | 0.7 |
| Cod liver oil | 0.4 | 0.4 | 0.4 | 0.4 | 0.4 | 0.4 |
| White fish offal | 22.9 | 22.9 | 22.9 | 22.9 | — | — |
| Herring, minced | — | — | — | — | 22.9 | 22.9 |
| Water | 40.0 | 40.0 | 40.0 | 40.0 | 40.0 | 40.0 |
| Caramel | 0.2 | 0.2 | 0.2 | 0.2 | 0.2 | 0.2 |
| Erythrosine | 0.01 | 0.01 | 0.01 | 0.01 | 0.01 | 0.01 |
| Glucose (Trudex) | 2 | — | — | — | 2 | — |
| Xylose | — | 2 | — | — | — | — |
| Sucrose | — | — | 2 | — | — | — |

"Trudex" (Trade Mark) is a high glucose content corn starch product containing more than 90% glucose.

All the ingredients were put into a heated bowl and mixed with heating until the temperature reached 80° C. The mixture was put into cans and sealed. The cans were cooked at 126° C. for 59 minutes, and then cooled.

Products A and B with reducing sugars had no fishy smell. Product E, with an oily fish and reducing sugar, had only a slight fishy smell as compared with F.

Products C, D and F had a pronounced fishy smell.

EXAMPLE 2

This example illustrates the use of the invention in a canned cat food.

|   | A | B |
|---|---|---|
| Minced poultry offal | 19.0 | 19.0 |
| White fish offal | 14.0 | 16.0 |
| Texturised vegetable protein | 6.0 | 6.0 |
| Blood | 9.0 | 9.0 |
| Water | 48.8 | 48.8 |
| Glucose (Trudex) | 2.0 | — |
| Gelling agent | 1.0 | 1.0 |
| Caramel | 0.2 | 0.2 |

The gelling agent and caramel were made into a gravy with the water and glucose. This was added to the rest of the ingredients. The whole mix was canned and cooked at 126° C. for 66 minutes. The finished product A was devoid of any fishy smell, and had a pleasant caramel odour whereas B had a pronounced fishy smell.

EXAMPLE 3

Example 1 was repeated, using a range of glucose additions between 0.1 percent. and 5 percent. The standard formulation was A in Example 1 but the water and glucose percentages were varied to give the required concentrations.

The finished products were examined for fish aroma, after storage. A storage period of at least seven days was necessary as the fish aroma increases with time and only reaches a noticeable level after this time period.

For each concentration of glucose the following standard mix was prepared as in Table 1.

TABLE 1

Standard Mix for 2 kg Batch.

| Ingredient | Percentage of Whole Mix (%) | Weight in 2 kg Mix (g) |
|---|---|---|
| Beef Trimmings (Minced) | 6.00 | 120.0 |
| Maize Grits | 17.00 | 340.0 |
| Blood | 9.00 | 180.0 |
| Salt | 0.70 | 14.0 |
| Cod Liver Oil | 0.40 | 8.0 |
| White Fish Offal | 22.90 | 458.0 |
| Caramel | 0.20 | 4.0 |
| Erythrosine | 0.01 | 0.2 |

The mix was then made up to 2 kg by the addition of a water/glucose solution, the solutions being prepared as in Table 2.

TABLE 2

Weights of Water and Glucose in Samples.

| Sample | Weight of Water (g) | Weight of Glucose (g) | Final Concentration of Glucose in Batch (%) |
|---|---|---|---|
| A | 875.8 | 0 | 0.0 |
| B | 873.8 | 2 | 0.1 |
| C | 865.8 | 10 | 0.5 |
| D | 855.8 | 20 | 1.0 |
| E | 835.8 | 40 | 2.0 |
| F | 815.8 | 60 | 3.0 |
| G | 775.8 | 100 | 5.0 |

Each batch was mixed well and heated to 80° C. with constant stirring. Each mix was then used to fill four tall cans, approximately 0.435 kg in each, after which the cans were sealed and processed at 126° C. for 59 minutes.

The cans were stored for ten days, after which time they were opened and assessed for aroma. The assessment took the form of an initial simple ranked difference test, which removed the strongest and weakest fish aroma samples. This gave a smaller number of samples to be compared, and allowed a difference test with a larger scale to be used. The results from the second test were examined for significance using the Multiple Range Test. (All tests can be found in "Methods for Sensory Evaluation of Food", Agriculture Canada, Publication 1284, 1970).

It was found that the low glucose concentration samples had a reduced fishy aroma which was higher than that of the mixes with a higher concentration of glucose, samples with above 1.0 percent. glucose having a very significantly reduced fishy aroma. In this example the relationship between fishy aroma and glucose concentration was found to be inversely proportional.

EXAMPLE 4

Using the mix formulation D of Example 1, enough mix was prepared for a final batch size of 18 kg after addition of water and reducing agent.

The reducing agents tested in this example were sulphur, sodium sulphite, sodium metabisulphite, cystine, sodium ascorbate, butylated hydroxy-anisole (B.H.A.) and lecithin.

Control Product: 1.1242 kg of standard mix was made up to 2 kg with water (0.8758 kg). This was then heated to 80° C. with constant stirring. This was then used to fill four tall cans which were then sealed.

Test Product: Two concentrations of reducing agent were used.

1. 2 percent. Here 0.5621 kg of standard mix was mixed with 0.02 kg of reducing agent and made up to 1 kg with water.
2. 5 percent. Here 0.5621 kg of standard mix was mixed with 0.05 kg of reducing agent and made up to 1 kg with water.

All the samples were then heated to 80° C. with constant stirring. Each sample was used to fill two tall cans, which were then sealed.

All the cans were processed at 126° C. for 59 minutes, after which they were stored for 14 days. After this time the aromas of the test product were assessed against the control. The compounds butylated hydroxy-anisole (B.H.A.) and lecithin which gave the most promising results were then used at a concentration of 0.5% which were tested.

The samples were prepared as above (with altered concentrations of compound and water) and the processed cans were stored for 14 days before their aromas were assessed against that of a control.

The addition of inorganic reducing agents to the product reduces the fishy aroma but tends to introduce sulphurous aromas into the product.

The B.H.A. and lecithin, markedly reduce the fish aroma of the canned products.

EXAMPLE 5

A standard mix was prepared using the ingredients as shown in Table 4. This was similar to the mix D of Example 1 except that the maize grits were not added at this stage.

TABLE 4

| Ingredient | Weight Added (g) | Percentage of Total (20Kg) Mix (%) |
|---|---|---|
| Beef Trimmings (Minced) | 1200 | 6.00 |
| White Fish Offal | 4580 | 22.00 |
| Blood | 1800 | 9.00 |

TABLE 4-continued

| Ingredient | Weight Added (g) | Percentage of Total (20Kg) Mix (%) |
|---|---|---|
| Salt | 140 | 0.70 |
| Cod Liver Oil | 80 | 0.40 |
| Caramel | 40 | 0.20 |
| Erythrosine | 2 | 0.01 |

The ingredients were mixed well together and then divided into two equal portions (3.921 kg each). 1.700 kg of yellow maize grits were separately added to 4.379 kg of water in a steam-heated bowl and heated to 80° C. with constant stirring. The grits were then allowed to cool, after which they were mixed with one portion of the standard mix. This gave a 0 percent. glucose control product. To make a 2 percent glucose test product the process was repeated but only 4.179 kg of water was added to the maize grits and 0.200 kg of glucose was added to the cooled grits before they were added to the second portion of standard mix. Forty small cans of both test and control product were prepared (eighty cans in all), with approximately 0.175 kg of mix per can. Four cans of each test and control product were then processed under the following time/temperature conditions: 760 min/100° C., 260 min/105° C., 88 min/110° C., 35 min/115° C., 18 min/120° C., 13 min/125° C., and at 20, 30, 40 and 50 minutes at 126° C.

The samples were assessed for aroma after seven days' storage at room temperature. An assessment was made of reduction of fish aroma in the test product against the control product processed under the same time and temperature conditions as the test product. The results are shown in Table 5.

TABLE 5

| Time (Minutes) | Temperature (°C.) | Sample/Aroma | |
|---|---|---|---|
| | | Control | Test |
| 760 | 100 | Fishy aroma | No fishy aroma detectable. |
| 260 | 105 | Fishy aroma | Strongly reduced fishy aroma. |
| 88 | 110 | Fishy aroma | Reduced fishy aroma |
| 25 | 115 | | Spoilage Aromas |
| 18 | 120 | | Spoilage Aromas |
| 13 | 125 | | Spoilage Aromas |
| 20 | 126 | | Spoilage Aromas |
| 30 | 126 | Fishy aroma | Slightly reduced fishy aroma. |
| 40 | 126 | Fishy aroma | Reduced fishy aroma |
| 50 | 126 | Fishy aroma | Strongly reduced fishy aroma. |

The results show that any product that had been processed under conditions to make it microbiologically stable had a reduced fishy aroma and the longer the product was processed the more reduced the fishy aroma.

EXAMPLE 6

A master mix was made from the following ingredients:

| Beef trimmings | 6.0 parts |
|---|---|
| Maize grits | 19.0 parts |
| Blood | 9.0 parts |
| White fish offal | 24.0 parts |
| Water | 41.7 parts |
| Byes (caramel and erythrosine) | 0.3 parts |

To this master mix were added the following sugars to give levels of

| Glucose | 0.5%, 1.0%, 2.0% |
|---|---|
| Lactose | 1.0%, 2.0%, 4.0%, 6.0% |
| Maltose | 1.0%, 2.0% |
| Galactose | 0.5%, 1.0%, 2.0%, 4.0% |
| Fructose | 0.5%, 1.0%, 2.0%, 4.0% |
| Xylose | 2.0% |

The sugar and master mix were mixed together, heated to 80° C. in a steam jacketed mixer, sealed in a can and heated at 126° C. for 59 minutes and then cooled. The cans of product were stored at room temperature for two months before assessment. The assessment was done by a trained group of people who described the aroma of the product by the intensity, on a scale of 0 to 5, of a set of odour descriptors. The intensity values were added up for each descriptor to give for any product an odour profile. The "fishy" descriptor levels for the aged products were as follows:

| Sugar % | Zero | 0.5% | 1.0% | 2.0% | 4.0% | 6.0% |
|---|---|---|---|---|---|---|
| Glucose | 12 | 10 | 3 | 0 | | |
| Lactose | 12 | | 5 | 2 | 0 | 2 |
| Maltose | 12 | | 5 | 6 | | |
| Galactose | 12 | 5 | 1 | 0 | 0 | |
| Fructose | 12 | 7 | 6 | 7 | 0 | |
| Xylose | 12 | | | 0 | | |

All the sugars tested reduced or eliminated the white fish offal smell.

EXAMPLE 7

Cysteine was added to a master mix of the same formula given in the Example 6, at 0.3 percent, 0.5 percent, 1 percent and 2 percent. In all cases the fishy odour was reduced.

I claim:

1. The process of preparing a packaged fish product of reduced objectionable fish odour, comprising packaging an objectionably odourous fish product in a container with a reducing sugar in quantity sufficient at high temperature to reduce objectionable fish odour, closing the container against the escape of volatiles, and cooking the closed container to reduce the objectionable fish odour of the enclosed product by the effect of the reducing sugar on the contents of the closed can under high temperature.

2. The process as claimed in claim 1 in which the reducing sugar is packaged with the fish product in the amount of from 1% to 5% by weight of the total ingredients.

3. A process as claimed in claim 1 wherein the reducing sugar is selected from ribose, glucose, xylose, lactose, galactose, fructose, maltose, arabinose, mannose, and rhamnose.

* * * * *